Aug. 3, 1937. B. A. JEFFERY Re. 20,460

METHOD OF AND APPARATUS FOR SHAPING ARTICLES

Original Filed Nov. 4, 1929 8 Sheets-Sheet 1

Inventor
Benjamin A. Jeffery
By Owen & Owen
Attorneys

METHOD OF AND APPARATUS FOR SHAPING ARTICLES

Original Filed Nov. 4, 1929 8 Sheets-Sheet 2

Inventor
Benjamin A. Jeffery
By Owen & Owen
Attorneys

Aug. 3, 1937. B. A. JEFFERY Re. 20,460

METHOD OF AND APPARATUS FOR SHAPING ARTICLES

Original Filed Nov. 4, 1929 8 Sheets-Sheet 3

Inventor
Benjamin A. Jeffery

By Owen & Owen
Attorneys

METHOD OF AND APPARATUS FOR SHAPING ARTICLES

Original Filed Nov. 4, 1929 8 Sheets-Sheet 4

Inventor
Benjamin A. Jeffery

By Owen & Owen

Attorneys

Aug. 3, 1937. B. A. JEFFERY Re. 20,460

METHOD OF AND APPARATUS FOR SHAPING ARTICLES

Original Filed Nov. 4, 1929 8 Sheets-Sheet 5

Inventor
Benjamin A. Jeffery

By Owen & Owen
Attorney

METHOD OF AND APPARATUS FOR SHAPING ARTICLES

Original Filed Nov. 4, 1929 8 Sheets-Sheet 6

Inventor
Benjamin A. Jeffery

By Owen & Owen
Attorneys

Aug. 3, 1937. B. A. JEFFERY Re. 20,460

METHOD OF AND APPARATUS FOR SHAPING ARTICLES

Original Filed Nov. 4, 1929 8 Sheets-Sheet 7

Inventor
Benjamin A. Jeffery
By Owen & Owen
Attorneys

Aug. 3, 1937. B. A. JEFFERY Re. 20,460

METHOD OF AND APPARATUS FOR SHAPING ARTICLES

Original Filed Nov. 4, 1929 8 Sheets-Sheet 8

Inventor

Benjamin A. Jeffery

By Owen & Owen

Attorneys.

Reissued Aug. 3, 1937 Re. 20,460

UNITED STATES PATENT OFFICE 20,460

METHOD OF AND APPARATUS FOR SHAPING ARTICLES

Benjamin A. Jeffery, Clarkston, Mich., assignor, by mesne assignments, to Champion Spark Plug Company, Toledo, Ohio, a corporation of Delaware Original No. 1,863,854, dated June 21, 1932, Serial No. 404,541, November 4, 1929. Application for reissue February 8, 1937, Serial No. 124,687

37 Claims. (Cl. 25—45)

Figure 1:
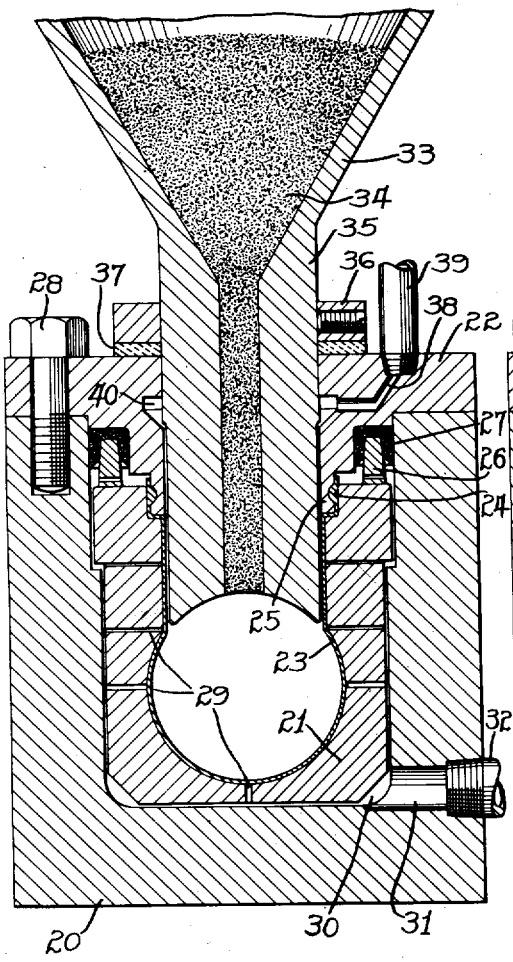
Figure 2:
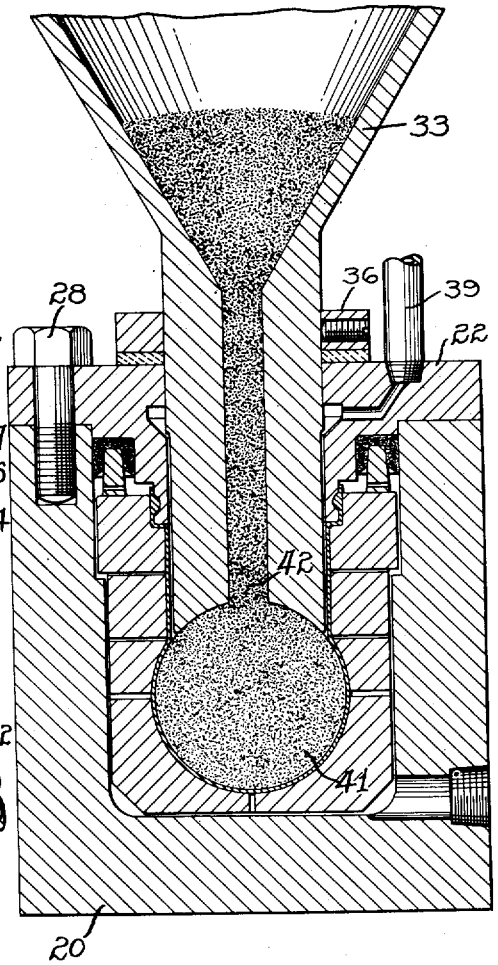

This invention relates to high grade porcelain and similar ceramic ware where conditions of structural uniformity are requisite, and to the shaping of other articles from powdered or granular material. The invention has for its object to prepare a ceramic article in condition for firing so that when the article enters the furnace it will be uniform throughout. More specifically, the invention relates to preparing a uniform ceramic powder and shaping this powder into an unfired ceramic article without disturbing the uniformity of the material.

One of the features of the invention relates to the treatment of ceramic material in such a way as to produce a uniform powdered material. Another feature of the invention is the use of differential air pressure in moving the powder into a mold cavity. Another feature of the invention is the compression of the material within the mold cavity substantially uniformly in all directions, or at every point in a direction perpendicular to the exterior surface outside that point.

Uniformity of composition and condition of the ceramic material is desirable in all forms of ceramic articles, but the necessity for such uniformity increases with increasing demands upon the articles such as are made upon high grade porcelains, and also with articles where the range of firing is comparatively narrow.

Inasmuch as ceramic articles customarily comprise different compositions which vary in physical characteristics, the combination of which is made to suit the particular requirements of the article, it will be readily understood that the desired characteristics will be produced with accuracy only when the composition is substantially uniform. This is true not only because the desired results can be produced only by the proper mixture of chemical combinations, but also because of the effect of the physical condition of the material upon the chemical and physical effects produced in firing.

Some of the materials in the ceramic batch melt at lower temperatures than other of the materials and the proper firing effect takes place uniformly throughout the mass only when the materials having different melting points are evenly distributed. Furthermore, the time and degree of melting and fusing is affected by the size of the grain so that for even firing there must be an even distribution of the material as to size of grains. In addition to these factors, the firing is affected by the degree of contact between grains. Other things being equal, transference of heat and also reaction between the grains takes place most rapidly where the grains are in closest contact with each other, so that the compactness of the material affects the results produced by firing. Furthermore, the results are affected by the penetration of kiln gases through the article during firing, and, therefore, not only the size of the voids but also their connection with each other must be uniform in order to produce uniform results. Air or other gases trapped in voids in the article produce large cells or act to disrupt the texture of the article to some extent while escaping, and therefore an excess of trapped gases must be avoided for best results.

It will be seen from the above that uniform results from firing can be realized only when both the chemical and physical characteristics of the fired article are uniform throughout.

It is comparatively easy to prepare a substantially uniform ceramic batch in the form of a slip. One method of producing ceramic articles is by the so-called casting method, in which this slip is introduced into a porous mold and the layer of material deposited upon the mold, when the water is absorbed from the slip, forms the article. There are, however, desirable ceramic mixtures which cannot be successfully formed by the casting method, and success with the method with any composition becomes increasingly difficult as the thickness of the walls of the formed article is increased. As soon as the coating of material begins to deposit upon the porous walls of the mold, the rapidity of the absorption of water is lessened, and it continues to lessen for various reasons with the increasing thickness of the deposit. This accentuates the time necessary for the deposition of any considerable thickness of material, and it is obviously difficult to prevent segregation of materials both as to grain size and as to composition where the slip must stand for a considerable period of time during the formation of the article.

In addition to the above noted limitations in the casting method, there is also difficulty, because of the wet plastic condition of the deposited slip, in handling the article during the drying and finishing operations, without deformation, or setting up strains that result in deformation during firing, and the removal of the comparatively great amount of water in the material introduces difficulties besides consuming considerable time.

One convenient method for forming articles, which are not readily cast, is to form the batch into a plastic mass and shape the plastic material into the form of the desired article. This method gives greater freedom in the selection of material, but it is very difficult to shape or work plastic material in any way without forming laminations in the material or introducing strains which will result in defects which will become apparent either before or after firing. It will be readily recognized that any frictional contact of the plastic material with any surface necessarily results in a rearrangement of the grains along or adjacent to the plane of the contact. As a result, articles formed by the plastic method necessarily contain striations and are not uniform throughout.

A batch of ceramic material can be thoroughly mixed and produced in the form of a powder which is fairly uniform. It is difficult to shape such powder into an article without introducing variations in the density of different portions of the article.

In order to make the material substantially uniform in grain size, it is prepared so that all grains are fine. When slightly moistened, the dust can be compressed so as to hold its shape; but any movement of any portion of the dust, during compression, along a surface with which it is in frictional contact, and any irregularity in the initial density of different portions of dust uniformly compressed, or any difference in the degree of compression to which uniform dust is subjected, or any variation from compression proportionate to the quantity of dust between the different portions of the compressing surfaces, results in different densities in different portions of the compressed article. Any relative movement between different portions of the mass, other than that of uniform compression, tends to form shear planes which become defective areas, because of the accumulation of air, less perfect contact of the particles, and different arrangement of particles, etc., at such places. Moreover, the fine dust normally contains much air in its interstices, and unless this air is sufficiently removed, it may check or crack the article, and unless it is removed uniformly, the fired product is not uniform.

While some features of the present invention relate to the production of a uniform ceramic batch in powdered form, the chief objects of the invention are to form such a powdered batch into articles and compress the articles sufficiently to hold their shapes without trapping air in the article or compressing some portions unduly with respect to other portions. Another object is to compress the material uniformly and sufficiently to establish an intimate and uniform contact between adjacent particles so that the articles ready for burning are practically free from internal stresses and strains, and so that the desired reactions are accomplished easily and uniformly during the burning operation. As will be readily apparent from the foregoing, articles formed in accordance with the usual methods exhibit, when fired, frequent deformation, warping, lamination, gas pockets, underfired or overfired portions, and other defects resulting from lack of chemical and/or physical uniformity after shaping. This invention greatly reduces or eliminates these defects common in articles shaped by other methods. The details of how the objects are attained will appear as the description proceeds.

Figure 6:
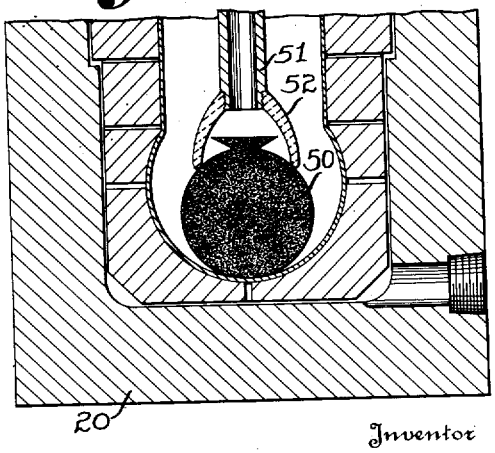
Figure 7:
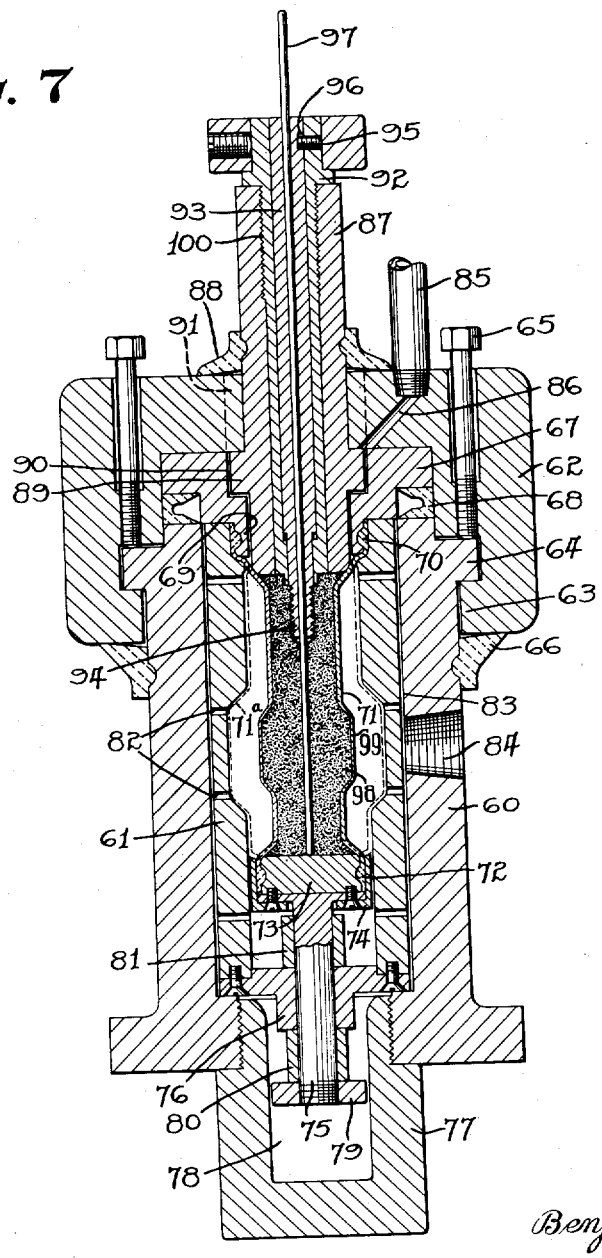
Figure 8:
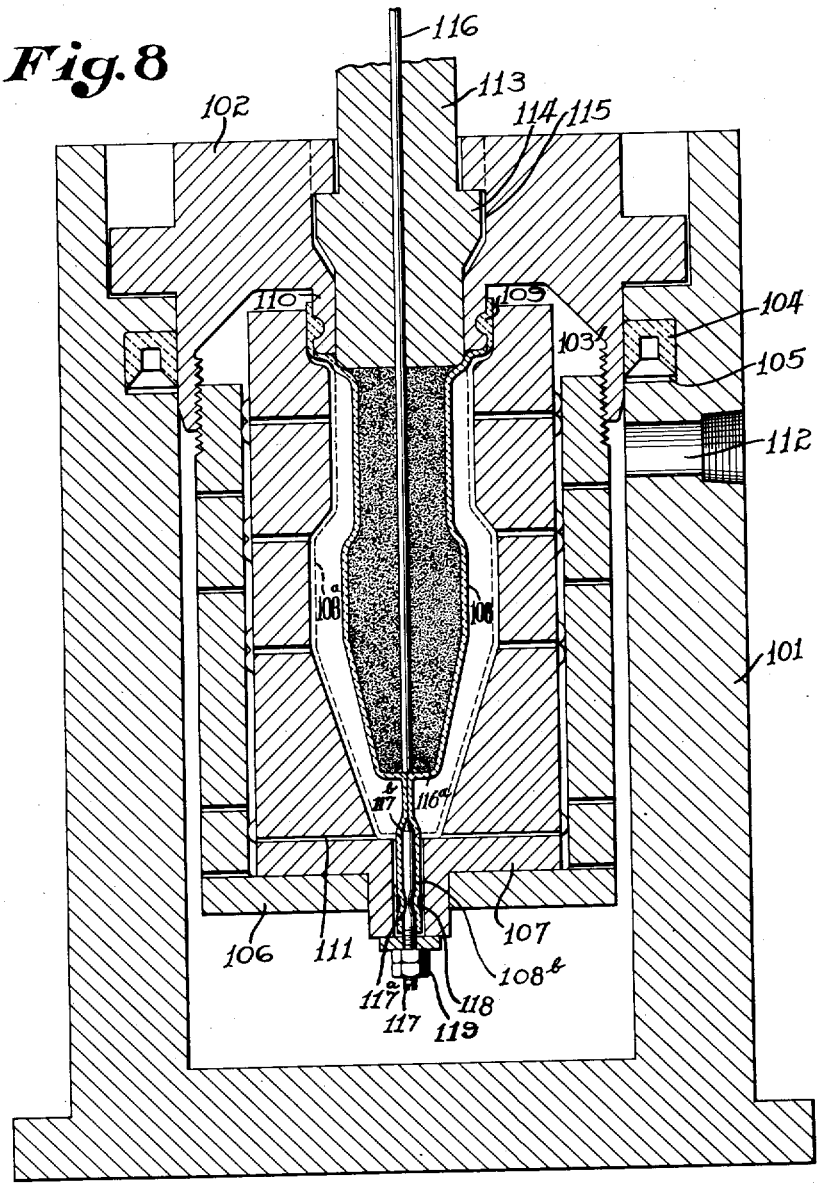
Figure 9:
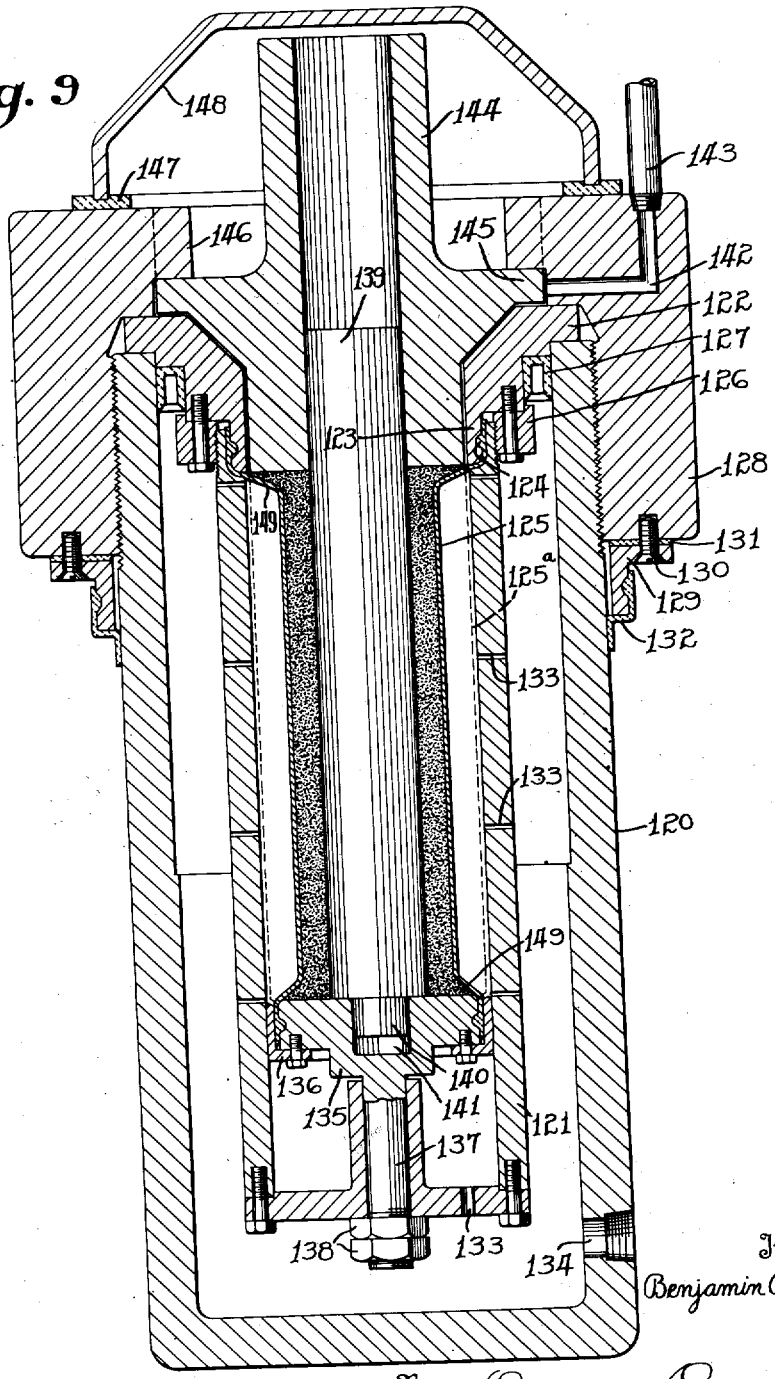
Figure 10:
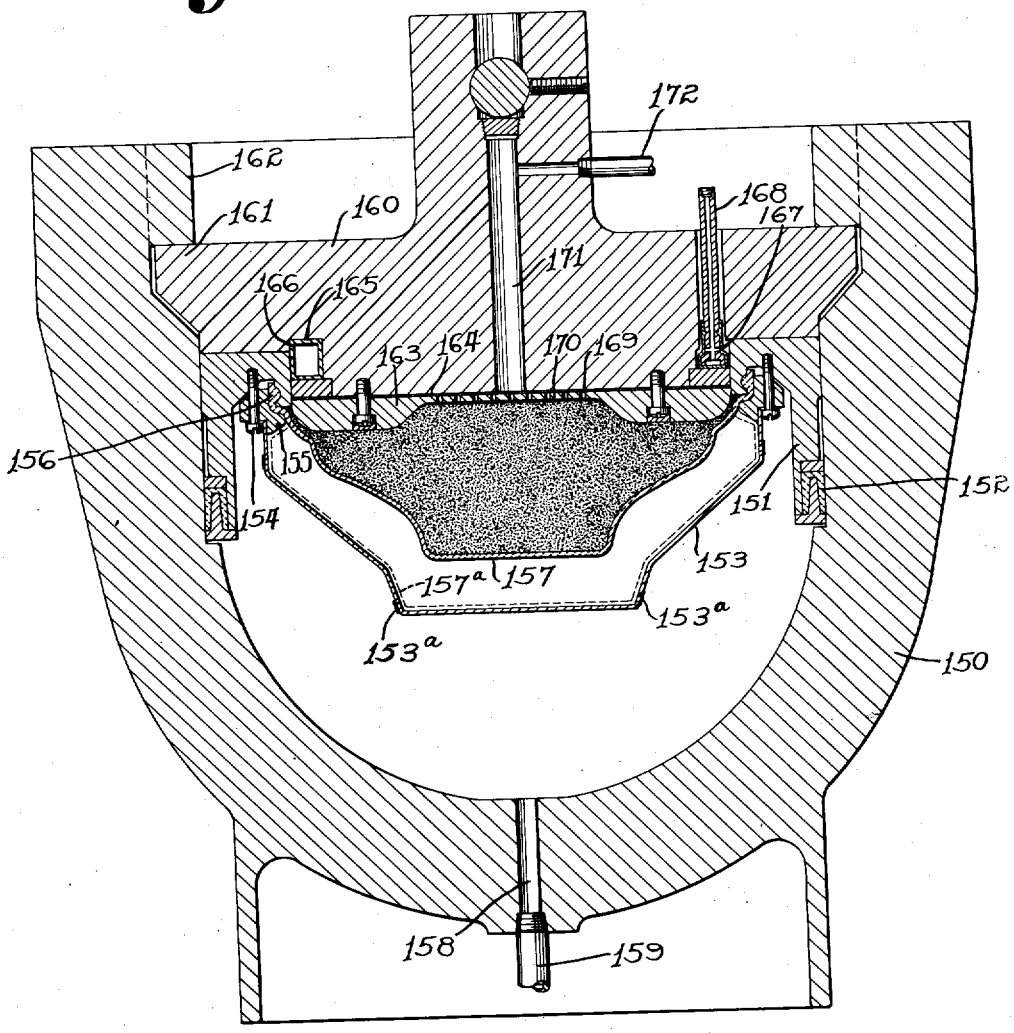
Figure 11:
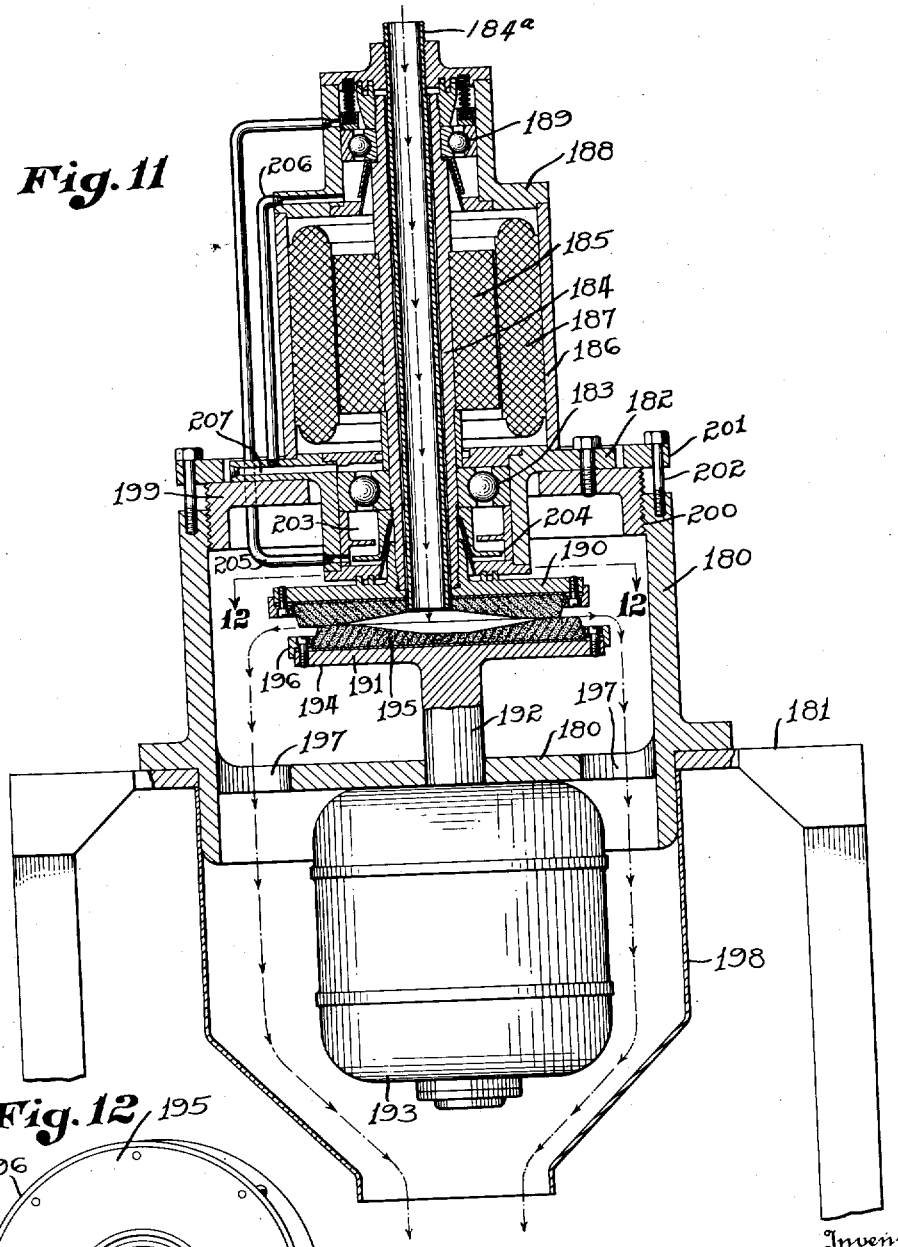
Figure 12:
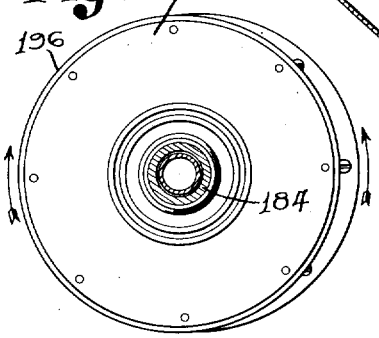
Figure 14:
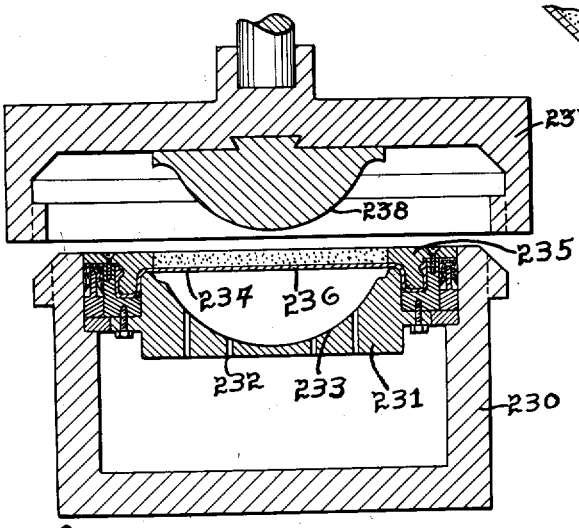
Figure 15:
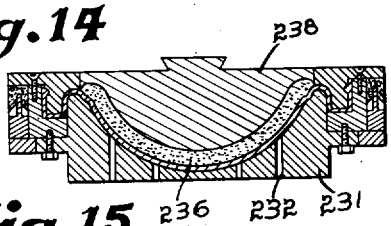
Figure 16:
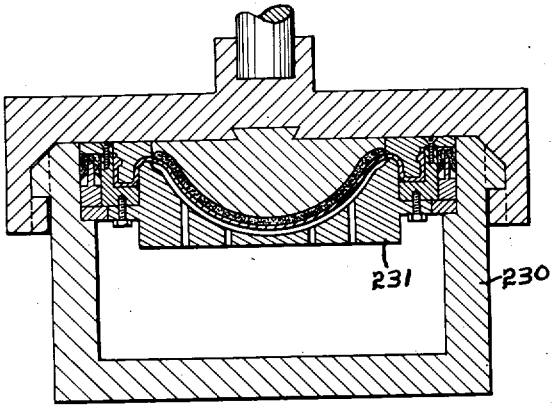
Figure 13:
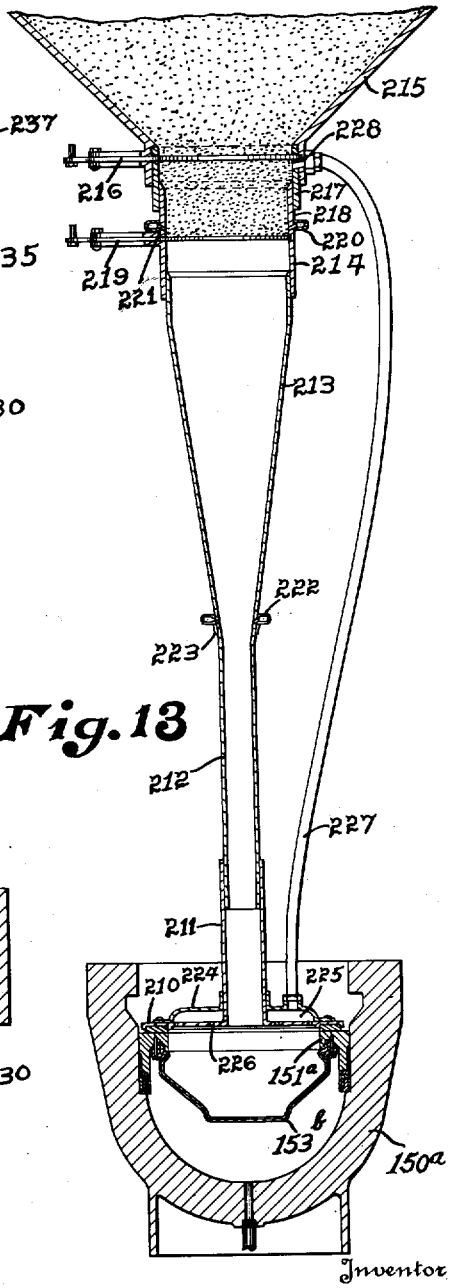

In the accompanying drawings forming a part of this specification, Figure 1 is a vertical section of one form of a mold adapted to mold a ball in accordance with this invention; Figures 2 to 6 show the same mold as Figure 1, but in different stages of the formation of a ball; Figure 7 is a vertical section of a preferred form of mold for forming a blank from which a spark plug core is turned; Figure 8 is a section of a modified mold for a different shaped core; Figure 9 is a further modification of a mold for a spool-shaped ceramic article; Figure 10 is a section of a mold for a high tension insulator blank; Figure 11 is a view partly in vertical section and partly in elevation of a device used in preparing the powdered batch; Figure 12 is a sectional view substantially on the line 12—12 of Figure 11; Figure 13 is a somewhat diagrammatical view of another form of filling device; and Figs. 14, 15, and 16 are views of successive steps in shaping a shallow dish.

In Figure 1 there is shown a mold casing 20 within which there is a liner 21. A cap 22 fits upon the upper side of casing 20 and holds liner 21 in place. Within liner 21 there is a rubber mold 23 which has a flange 24 held in place between the upper edge of liner 21 and a grooved plunger 25 on cap 22. A ring 26 resting upon liner 21 is covered by a packing 27 which makes a tight joint between the cap and the casing, when the cap is clamped on the casing by screws 28 or the like.

Liner 21 is provided with a plurality of ducts 29 which lead from the interior of the lining to relief grooves 30 between the liner and the casing. Relief grooves 30 form passages connecting with an outlet passage 31 from which there leads a pipe 32.

A funnel-shaped hopper 33 for powdered ceramic materal 34 has a discharge tube 35 adapted to enter the opening in cap 22 and the upper end of the rubber mold 23. A flange 36 is fixed upon tube 35 and rests upon a packing ring 37 which in turn rests upon cap 22. The underside of tube 35 is concave, as shown.

A passage 38 in cap 22 leads from a pipe 39 to relief passage 40 about tube 35.

Figure 3:
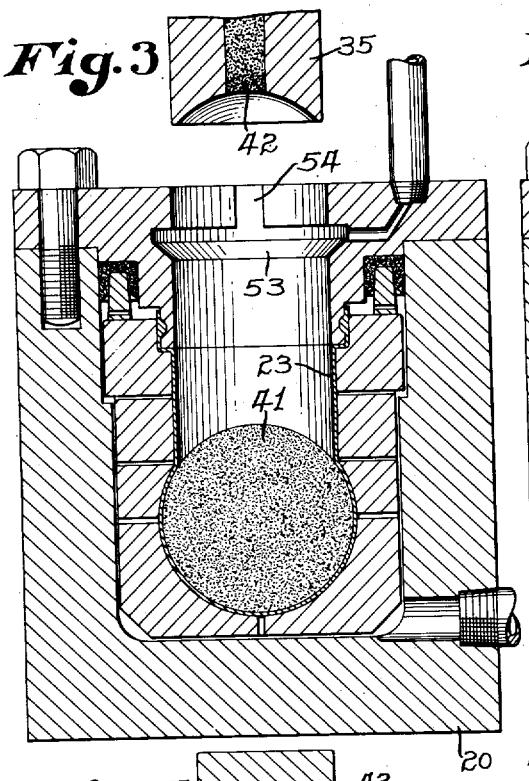
Figure 4:
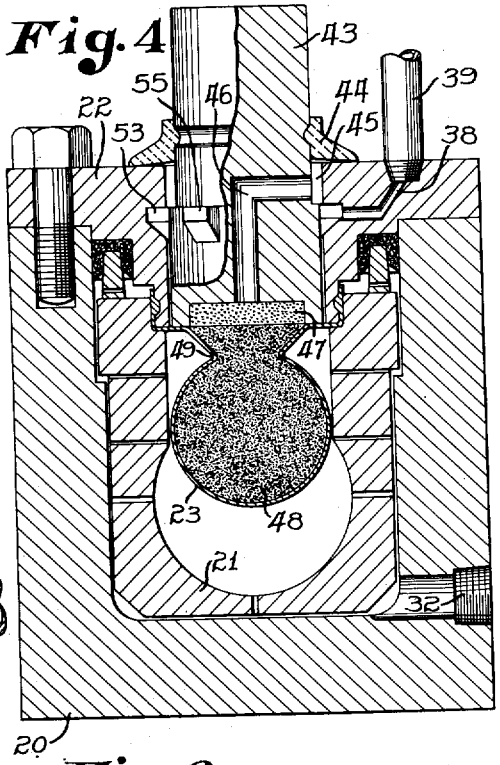
Figure 5:
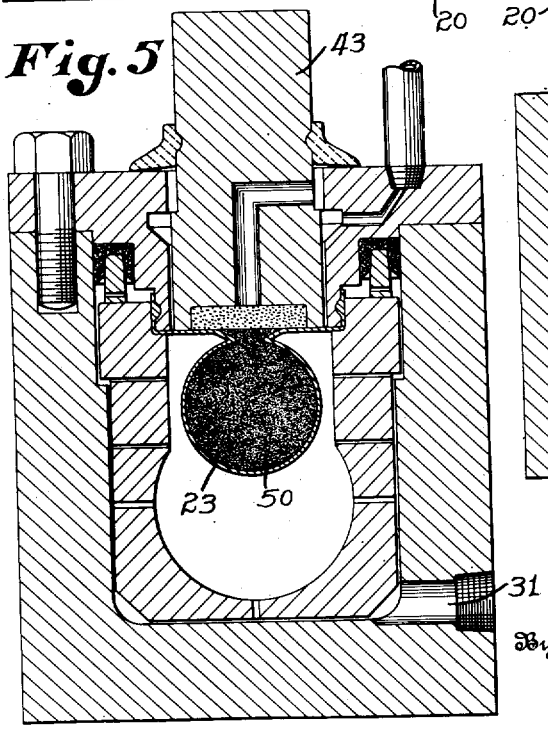

In the operation of the device, the parts are assembled as shown in Figure 1, except for the funnel 33. Then pipe 32 is connected with a suitable source of vacuum and the air is exhausted from around and within the liner so as to expand rubber mold 23 against the inner surface of a liner. Hopper 33 is then placed in the position in which it is shown in Figure 1 and pipe 39 is connected to a source of vacuum, thereby exhausting the air from the space beneath tube 35 within mold 23. The vacuum produced within mold 23 should not be as high as that outside of the mold, so the mold remains expanded, but the dust is delivered through pipe 35 into the mold cavity. Reduction of pressure in the mold allows the air in tube 35, immediately above the liner end thereof, to expand and blast the powder therebeneath into the mold, making way for a like operation in the layer thereabove. When the air trapped in the powder at the beginning of the operation is under greater pressure than the air in the mold, the trapped air expands, reducing the density of the powder and lessening friction on the walls of the tube. Pressure applied upon the powder above or at the upper end of the tube tends to pack the powder and increase friction in the tube. For this reason, expansion of air in the powder within the tube is an important element in the successful introduction of powder into the mold. At the same time, air is exhausted from the dust and it is thereby compacted and fills the mold cavity uniformly and more densely than it would if the air were not drawn therefrom. In this way, a fairly uniform ball of dust 41 is formed within the mold cavity and this dust contains comparatively little air. The dust 42 within pipe 35 will be sufficiently compacted so that when funnel 33 and pipe 35 are withdrawn, as indicated in Figure 3, the dust in tube 35 will remain as a plug therein and the line of separation will be substantially a continuation of the concave under surface of pipe 35, as indicated in Figure 3.

After funnel 33 has been withdrawn, a plunger 43 is introduced in place thereof. Plunger 43 has surrounding it a ring 44 of rubber or the like which forms a tight joint between the plunger and the upper surface of cap 22. Plunger 43 is of such a diameter as to form a relief passage 45 around the plunger between it and cap 22 and from this relief passage there is a passage 46 which leads downward to a porous pad 47 sunk in a recess in the lower end of the plunger.

After the plunger has been introduced, vacuum surrounding liner 21 and mold 23 is broken and at the same time vacuum is again applied through pipe 39 and passages 38, 45, and 46, whereby the comparatively compressed ball 48 is drawn up towards the plunger, there being formed a constricted neck 49. Thereafter, pressure is introduced through passage 31 and as will be readily apparent, applies uniformly throughout the outer surface of the ball and compresses it to the condition in which it is shown at 50 in Figure 5. Thereafter passage 31 is again connected with a vacuum and mold 23 is expanded, releasing the ball, as indicated in Figure 6. Then the ball may be removed from the mold by suitable means such as a suction pipe 51 having a cup 52 on the end thereof adapted to fit ball 50.

Plunger 43 may be held in position in the mold in any desired manner, but in the construction shown, cap 22 is provided with a groove 53 and slots 54 through which teeth 55 on the plunger may enter the groove. After the plunger has been depressed until teeth 55 are in groove 53, the plunger is given a partial rotation so that it is held by the tooth and groove connection in fixed position longitudinally.

The rubber form or mold 23 should be slightly smaller than the compressed article, so that it will remain stretched over the article when pressure is relieved.

After ball 50 has been removed in the manner illustrated in Figure 6, hopper 33 may be returned to position and the operation repeated to form another ball.

The construction shown in Figure 7 is particularly arranged for shaping a blank for a spark plug core. In this apparatus there is provided a casing 60 having a liner 61 therein. A cap 62 has flange teeth 63 adapted to pass downward between and be engaged beneath flange teeth 64 on the top of casing 60. The cap may be tightened in position on the casing by means of screws 65. A rubber packing ring 66 surrounding the casing beneath the cap acts to make a vacuum tight joint. A mold-holding ring 67 fits within the cap and is held by the cap against a packing ring 68 on top of the casing and is provided with a flange 69 between which and the top of liner 61 there is held the top 70 of a rubber form 71. The lower end 72 of form 71 is clamped upon a plunger head 73 by means of a flange 74 affixed to the head. A stem 75 extends downward through the bottom 76 of liner 61 into a member 77 attached to the bottom of the casing and having therein a recess 78. Stop nut 79 is attached to the bottom end of plunger rod 75 and a collar 80 is provided between members 76 and 79 and a collar 81 is provided between member 76 and the head of the plunger. The collars are so proportioned as to allow a limited longitudinal movement of the plunger and head. Casing 61 is provided with openings 82 and relief passages 83 leading to a passage 84 through the casing to which a pipe can be attached. When passage 84 is connected with a suitable source of vacuum, liner 71 is drawn out to the dotted line position 71[a] and while in this position, and with the plunger lowered as far as collar 81 permits, a funnel similar to funnel 33 with its tube 35 may be positioned on the casing. A pipe 85 leads from a passage 86 through the cap to a suitable source of vacuum and partial vacuum applied to this pipe enables the expanded rubber form 71 to be filled with dust in the manner described in connection with Figures 1 to 6. After the mold has been thus filled with dust, the funnel is removed and plunger 87 is inserted. This plunger is similar to plunger 43, having a rubber packing ring 88 adapted to rest on top of cap 62 and having clamping teeth 89 adapted to enter a recess 90 in member 67 beneath the top of cap 62, the top of the cap being cut away, as indicated by dotted lines at 91, to permit the insertion of the teeth 90.

Within plunger 87, there is a sleeve 92 which is screwed into the plunger. Within the sleeve there is a plug 93 having a screw threaded end 94 extending into the mold cavity. A stop screw 95 in sleeve 92 extends into a slot 96 in plug 93, the slot 96 being large enough to allow plug 93 a slight play longitudinally of the sleeve. Within plug 93 there is a rod 97 which normally extends downward to rest upon plunger head 73. This rod is lowered into position through the dust immediately after plunger 87 is fixed to position. Thereafter vacuum is again applied through pipe 85 to exhaust air from the dust within rubber form or mold 71 and pressure is admitted through passage 84, relief passages 83 and openings 82 in the lining so as to compress the material within form 71.

In the form shown, the article is made with a shoulder 98. The portion 99 of the form where this shoulder occurs is made somewhat thinner than other portions of the rubber form, and therefore stretches more than other portions of the form when the form is expanded against lining 61. When the vacuum on the outside of the form is broken, the thinned portion 99 does not contract as strongly as it would if it were as thick as other portions of the wall, and so tends to flatten shoulder 98 less than would a form having walls of uniform thickness. After the article has been compressed, the pressure is relieved through passage 84 and the vacuum through pipe 85 is broken. While air and other gases are largely exhausted from the compressed dust, there inevitably remain some gases within the compressed dust and there is sufficient elasticity to result in a slight expansion of the material when pressure is relieved. The mounting of plunger 73 permits the necessary longitudinal expansion of the entire body, but if screw-threaded end 94 of plug 93 is held rigid in relation to the end of plunger 87, this expansion of the material longitudinally has a tendency to strip the threads formed therein. The longitudinal play allowed plug 93 is sufficient to take care of this slight expansion of the material when pressure is relieved. Sleeve 92 may be screwed into plunger 87 by threads 100 which are substantially the same pitch as threads 94 and the sleeve and plug may be turned together to withdraw the plug from the compressed article, thus avoiding any injury to the comparatively fragile threads formed by end 94. After the plunger has been removed, vacuum may be applied through passage 84 to expand form 71, thereby releasing the completed article which may be then removed in any convenient manner. The apparatus is then in condition to have a hopper once more applied thereto so that another article may be formed.

Figure 8 shows a device very similar to Figure 7, so that a lengthy description thereof will not be necessary. In this case the casing 101 is large enough so that there is a double lining within the casing. By changing the lining or linings, blanks of different sizes and shapes may be formed in the same casing. A cap 102 fits within the top of the casing and has a downwardly directed flange 103 fitting within a packing 104 in a groove 105 in the casing. Within flange 103 there is screwed the upper end of a holding member 106. Within this holding member there is a liner 107 having therein a cavity substantially the shape of the article to be formed. Rubber form or casing 108 has its upper end 109 clamped between the upper end of liner 107 and a flange 110 on cap 102. Liner 107 and support 106 are formed with passages 111 which connect the interior of the liner with the cavity of the casing surrounding the support. A passage 112 through the casing is provided for applying pressure or vacuum, as in the other forms of the device. It will be readily understood that the form is expanded to the position indicated by dotted lines 108[a], in the same manner as described in connection with Figure 7, and dust is filled into it by hopper and vacuum means, not shown. Thereafter plug 113 is inserted in the cap the plug having teeth 114 which fit into groove 115 in the cap. A rod 116 similar to rod 97 is employed for forming a longitudinal passage through the article. A pin 117 is inserted in the lower end 108[b] of rubber form 108. The pin is provided with a groove 117[a], and the form is secured to the pin by a cord 118 which binds it into the groove. The lower end of the pin is threaded and is provided with lock nuts 119 by which it may be adjusted in position to hold form 108 slightly stretched. The conical upper end 117[b] of the pin fits into a socket in the bottom end 116[a] of rod 116, when the rod is in fully lowered position.

In the construction shown in Figure 9, there is illustrated apparatus suitable for forming a spool-shaped blank. In this case there is a casing 120 within which there is a liner 121. A support 122 rests upon the top of casing 120 and has a downwardly directed flange 123 between which and the top of liner 121 there is clamped the upper edge 124 of rubber mold or form 125. Support 122 has attached to its under side a ring 126 within which the upper end of liner 121 is screwed. A packing 127 is provided between support 122 and the upper end of casing 120. Fitting over the top of casing 120 there is a cap 128. A clamping ring 129 is attached to the bottom of cap 128 by screws 130. A packing ring 131 is provided between clamping ring 129 and the lower edge of cap 128 and a ring 132 of rubber or the like is provided on the lower edge of clamping ring 129 in order to make an air-tight fit with the outside of the casing thereby forming a vacuum seal. Vent passages 133 through the liner connect the interior thereof with the space in the container therearound and is provided with a passage 134 through the casing by means of which pressure or vacuum may be applied. Within the bottom of liner 121 there is a plunger head 135 to which the lower end of rubber form 125 is clamped by a clamping ring 136. Head 135 is provided with a stem 137 which projects downward through the bottom of liner 121 and is provided with stop nuts 138 beneath the bottom. Stem 137 is of such length, and the stop nuts are so positioned, that there is a slight longitudinal play of head 135 within the liner. It will be readily understood that with the rubber form expanded to the position indicated by dotted lines 125[a], a core 139 may be introduced into the mold, being properly centered by a stud 140 entering a recess 141 in head 135. A hopper similar to hopper 33 is then applied to cap 128 and the mold cavity evacuated through passage 142 and pipe 143, so as to properly fill the mold cavity with dust. Thereafter, the hopper or funnel is removed and a plug 144 is placed in position with its teeth 145 beneath teeth 146 on cap 128. A packing ring 147 may be placed upon the top of cap 128 and a cover 148 resting on this packing ring covers the plunger and makes an airtight closure for the top of the molding apparatus so that vacuum may be applied through pipe 143 before and during the pressing operation, which it will be understood is performed by pressure admitted through passage 134. Thereafter, the space surrounding rubber form 125 is evacuated so that the form is expanded and the shaped article can be removed. The slight expansion of the material when the pressure is released is sufficient to make it easily removable from the core.

It will be readily understood that the flanges 149 formed on the ends of the article may be left in position thereon if a spool-shaped article is desired, or these flanges may be removed if a cylindrical article is desired. The dust does not readily slip along the end of head 135 or plug 144 so that when the rubber form is compressed therearound the material takes the shape indicated in the drawings. This obviously results in a compression which is not absolutely uniform, but the pressure exerted against the outside of rubber form 125 and therefore exerted by the form against the material therein is equal in all directions and therefore the compression of the ends of the article is not seriously different from that of the body thereof.

The apparatus indicated in Figure 10 is suitable for forming a high-tension insulator or similar article. In this device there is a casing 150 within which there is a support 151 resting upon a packing ring 152. An outer molding form 153 is held by screws 154 against the bottom of a ring 155 which in turn is held by the same screws against support 151. The upper edge 156 of a rubber form or mold 157 is clamped between ring 155 and a flange on support 151. Mold form 153 is provided with perforations 153[a] and an outlet passage 158 from the casing is connected to a pipe 159. The material may be introduced into mold 157 when expanded, as shown in dotted line 157[a], either by a hopper or funnel similar to that disclosed in Figure 1, or, owing to the particular shape of this mold, the powder may be directly introduced therein without the intervention of such a funnel, if preferred. After the mold has been supplied with material, a plug 160 is introduced into the top of the casing above support 151. The plug may be held in place by teeth 161 beneath teeth 162 on the top of the casing. The under side of the plug is provided with a shaping plate 163 adapted to give the desired shape to the top of the article. Between plate 163 and plug 160 there is a sheet 164 of porous material. Plug 160 is provided with an annular groove 165 in which there is fitted a rubber tube 166 having at one point an inlet opening 167 into which there is fitted a tube 168 extending upward through member 160. Tube 166 may be expanded by compressed air introduced through tube 168, to form a secure vacuum seal. Plate 163 is provided with apertures 169 and with a porous lining sheet 170 on the inside of the plate covering these apertures. In this way there is provided passage for air from the contents of the mold through sheet 170, openings 169 and sheet 164 through a passage 171 in the plug which is connected by a pipe 172 to a suitable source of vacuum. The operation of the device will be sufficiently understood from the foregoing description without repeating the steps in the procedure.

Figure 13 shows somewhat diagrammatically apparatus for an alternative method of introducing powder into a mold similar to that shown in Figure 10. It will be understood that this device may be used for introducing material into other molds, but it is particularly adaptable for use where a considerable quantity of powder is required to form the blank.

In Figure 13 there is shown a casing 150a with an interior form 153b, etc., similar to the parts disclosed in Figure 10. Adapted to rest upon the upper surface of ring 151a there is a cover plate 210. A tube 211 opens through the central portion of cover plate 210 and extends upward therefrom. Telescoped into tube 211 there is a tube 212, the upper end 213 of which is expanded and telescoped into a guide 214.

A hopper 215 is provided for supplying the material to the mold. At the bottom of the hopper there is a gate 216 for controlling the passage of material to a casing, the casing comprising an upper portion 217 and a lower portion 218 telescoped therein. Between portion 218 and guide 214 there is a gate 219. By adjusting the portion 218 within portion 217, the capacity of the chamber can be regulated.

Surrounding portion 218 and immediately above gate 219 there is a ring 220 connected by any suitable means, not shown, with a source of air under pressure. A series of apertures 221 connect the interior of ring 220 with the lower part of the measure chamber, these apertures being preferably directed downward as well as inward.

A ring 222 similar to ring 220 may be provided at the point where the flaring portion 213 joins the straight tubular portion 212 of the guide tube, apertures 223 leading from the interior of ring 222 to the interior of the guide tube. Ring 222 also is connected by suitable means, not shown, with a source of air under pressure.

Above plate 210 there is a collar 224 providing an annular space 225 connected with the interior of the mold chamber by perforations 226 through plate 210. A pipe or hose 227 connects chamber 225 with one or more perforations 228 directed downwardly through the wall of portion 217 immediately beneath gate 216.

It will be readily understood that when a charge is to be placed in a mold the parts are assembled as shown in Figure 13, with the chamber between gates 216 and 219 filled with powder from hopper 215. The material in the chamber should be thoroughly permeated with compressed air before gate 219 is opened. This may be done either by introducing air through ring 220 or by maintaining the material in the hopper under air pressure, or in any other desired way. When gate 219 is opened, additional air may be admitted to ring 220 and also into ring 222 or any additional places where clogging might otherwise occur. It will be readily understood that the air compressed within the material blows the lower portion or layer of powder downward, and as the powder thereabove falls, each successive layer in like manner is blown downward, so as to have an effect upon the powder similar to that described above where vacuum within the mold is employed. This may be supplemented by the inward and downward blasts from rings 220 and 222, if necessary.

As the pressure from air entering the mold with the powder increases the pressure in the mold, the air escapes through perforations 226 and passes upward through pipe or hose 227, returning to the measuring chamber through perforations 228. This also assists in blasting the powder downward.

After the mold has been filled, plate 210 may be raised by telescoping tubes 211 and 212 and the mold removed and subsequent operations performed in a manner similar to that previously described.

Figures 14, 15, and 16 illustrate the formation of a blank for a shallow dish. Casing 230 is provided with an interior form 231 having openings 232 therethrough. Form 231 has a cavity 233 in its upper surface. Normally stretched across the top of this cavity there is a rubber sheet 234. Around the edges of the rubber sheet there is a ring 235. Powder 236 may be placed upon rubber sheet 234 within ring 235 in any suitable manner and leveled off, as indicated in Fig. 14. Thereafter, there may be applied to the mold a cover 237 carrying a form 238 which depresses the powder substantially to the surface of concavity 233, when the cover is locked in position on the mold. Preferably, member 238 is connected to the cover in such a manner that the cover may be oscillated to lock it in position upon the mold without moving member 238, as it is undesirable to turn member 238 after it has been placed in firm contact with the powder in the mold.

After the parts have been assembled as described, so that member 238 rests upon powder 236 as indicated in Figure 15, the air and gases from the powder may be exhausted by suitable means, not shown but readily understood from their illustration in the other figures. The powder is compressed by pressure introduced within casing 230 and passing through openings 232 and exerting pressure against the rubber sheet.

Where a deeper dish is to be made, the rubber lining may be expanded against the form and the powder introduced into the expanded rubber form and given approximately the desired shape by a sweep or other readily understood devices. While a number of methods of giving the initial shape to the powder have been described, it will be understood that this phase of the method may be varied to suit the article to be produced.

While it is desirable to give a preliminary shape to the powder as close as practicable to that of the completed blank, and it is also desirable to have that blank approximate as closely as possible the shape and proportions of the finished article, it will be readily understood that portions which cannot be given their final shape and readily pressed uniformly may be formed with an excess of material and the compacted blank may then be given the desired form. As a matter of fact, some final shaping is usually requisite after the material has been compacted, but it will be readily understood that this is reduced to a minimum wherever practicable.

The dust may be prepared for introduction into any of the above described molds by any method which will produce a uniform fine dust with proper moisture content evenly distributed therethrough. One method by which this may be accomplished is to spray slip through a drying device which dries the slip sufficiently and deposits the material in powdered form retaining the desired amount of moisture.

Another method which has been found commercially successful is to prepare the slip in the usual manner and then dry in the usual filter press to a practical limit of about 25% moisture. The filter cake is then dried to about 4% or 5% moisture, and thereafter granulated. This granulation may be effected by passing the filter cake through rollers rotating at different speeds and positioned around a quarter of an inch apart so as to form small granules from the filter cake. These granules may then be moistened and allowed to stand until the moisture is evenly distributed throughout, which ordinarily requires about 24 hours. About 10% moisture has been found a workable amount for materials such as are commonly used in porcelain for spark plug cores, but a variation between 3% and 14% is readily permissible. After the granules have become evenly moistened they may be further reduced in size by a suitable device. It has been found satisfactory to pass them between rollers rotating at different speeds and spaced about 1/32nd of an inch apart.

For the final disintegration of the powder there has been devised apparatus disclosed in Figures 11 and 12. In this construction there is a casing 180 mounted upon any desirable support 181. The upper portion of the casing carries a support 182 in which there is mounted a bearing 183 for the lower end of a hollow shaft 184 carrying the rotor 185 of an electric motor. A casing 186 mounted upon support 182 carries the stator 187. On the upper end of casing 186 there is mounted a support 188 carrying the upper bearing 189 for shaft 184. The lower end of shaft 184 carries an upper grinding element 190 in proper relation to a lower grinding element 191. Lower grinding element 191 is carried on the upper end of a shaft 192 of a motor 193 suitably supported from the bottom of casing 180. Each of the grinding elements comprises a disk 194 having a saucer-shaped grinding element 195 attached thereto by a flange ring 196. The grinding elements are eccentrically arranged as clearly indicated in Figure 12 and are rotated in opposite directions at a high rate of speed. It will be readily understood that the granulated material is introduced through stationary feed pipe 184a within hollow shaft 184 and is thrown outward by centrifugal force and pulverized between the grinding surfaces 195 and discharged from the edges thereof, whence it falls through opening 197 in the floor of casing 180 and is collected by a guide 198 surrounding motor 193 and discharging the pulverized material into any desired receptacle. In the construction shown, support 182 is mounted upon a ring 199 screw-threaded at 200 into the top of casing 186. Ring 199 is held in its adjusted position by a clamping ring 201 which may be clamped thereon by screws 202.

Lubrication of the bearings is provided for in the following manner. Oil from space 203 in bearings 183 is discharged by a flange 204 which acts as a centrifugal pump to discharge the oil through a pipe 205 leading to the upper bearing, from thence it descends through bearing 189 and pipe 206 to bearing 183.

It will be seen that the upper grinding member can be very accurately adjusted. A clearance of .012 inch between the disintegrating surfaces has been found satisfactory. In cases where the article would be injured by metal eroded from the grinding surface, the grinding surfaces may be formed of sillimanite porcelain or other material which will not injuriously affect the article. The motor of the lower grinding element may be mounted on a similar precision adjustment, if desired, and a similar oiling system is provided for the lower motor, if desired.

Other disintegrating methods may be used. For some materials it is satisfactory to dry the filter cake to a moisture content of 8% to 12% and disintegrate in a device of the beater type, or by any other suitable disintegrator, it being preferable to screen the disintegrated material, where a disintegrator of the beater type is used, in order to avoid including any unduly large particles.

The operation of the various devices has been described in connection with their construction, but for convenience the general principle of operation may be reviewed. There is first produced a powder substantially uniform throughout both as to composition and distribution of grain sizes and water content. This substantially uniform powder is fed into an elastic container approximately the shape of the desired article, but at the time of filling having a cavity considerably larger than said article. Preferably, the powder is introduced into the container by evacuating the container and connecting the filling opening of the container with a supply of the powder. In this way the powder is moved into the container quickly, uniformly, and in a more dense condition than would result from merely pouring the powder into the container. This allows the use of a smaller receptacle for the powder to make the given article than would be permissible if vacuum filling were not employed, and reduces the amount of compression necessary to produce the shaped article ready for firing.

After the charge has been introduced, the supply pipe is removed and the top of the mold closed, after which the interior of the mold is connected with as high a vacuum as is readily obtainable. As previously indicated, the vacuum in the interior of the mold during the filling operation is not as high as outside of the rubber form, and is chiefly for the purpose of moving the material into the mold. The subsequent evacuation of the mold cavity is to remove the air and gases from the powder, so that the compressed blank will have the entrapped gas therein eliminated as far as practicable. This is desirable because of its results during firing. An additional advantage is that it renders possible the comparatively prompt release of pressure after the blank is compressed, whereas if gas is trapped in the compressed blank, the release of pressure must be slow to allow the escape of the air without cracking or injuring the blank, and even with slow release of pressure, there is danger of injury from the expansion of the trapped gas.

The condition of the powder, when placed in the mold by differential air pressure, is favorable to the removal of gas therefrom, as the expansion of the gas within the powder during its passage through the tube into the mold bursts any sealed pockets and therefore the gas can escape readily.

After the gas has been as completely evacuated from the powder within the mold as is practicable, the inlet to the casing is connected with a supply of fluid under pressure which enters the casing and acts upon the exterior of the rubber form or mold. The connection of the interior of the mold to high vacuum is continued during the pressing operation. The uniform hydraulic pressure applied in this way results in compressing the powder substantially uniformly in all directions so as to make a compressed article which is substantially uniform throughout as to composition, grain size, density, and extent and shape of pores. After the article has been thus compressed the pressure fluid is drawn out of the casing. Since there is comparatively little gas trapped within the compressed material, it does not expand sufficiently to be affected injuriously when pressure is relieved.

It will be noted that when the article to be molded has one dimension materially greater than another, the contraction of the elastic container is limited in the direction of the longer dimension so that it is not as great proportionately in that direction as in the other. For example, in Figs. 7 and 9, where approximately cylindrical articles are shown, the axial movement of plungers 73 and 135, respectively, is limited, so that the radial contraction of the container during compression will be relatively greater than its axial contraction. In the construction shown in Figs. 10 and 14 to 16, likewise the apparatus is arranged to contract the container during compression chiefly in the direction of the thickness, or smaller dimension, of the article. This is accomplished by clamping the edges of the rubber container, by ring 155 or 235, so that the largest diameter of the article is reduced only slightly. This facilitates proper release of the article.

It is desirable to have this compressed blank as near as practicable the shape of the finished article, but where accuracy of shape is necessary, the compressed blank may be ground off or otherwise trimmed to exact shape before firing.

An article formed in this way can be fired quickly and with uniform results throughout.

A number of different forms of molds have been illustrated, and it will be readily understood that the same principles of construction may be employed to form various other shapes. The method may be employed in other cases where it is desired to compact granular or powdery materials, as in forming carbons for arc lights, large carbon electrodes, and other instances where the forming of granular or powdery material into uniform products is desired.

Where the term "powder" is used in the claims, it is intended to cover material consisting of solid discrete particles, of any moldable size, whether produced by grinding or spray drying, as described above, or in other suitable ways.

I claim:

1. The method of forming a compressed shape from powdered or granular material, which comprises introducing the material between an interior rigid core and an elastic surrounding container of substantially the same internal shape, but of larger size, than the exterior of the desired article and compressing the container with the material therein by substantially uniform fluid pressure external to the container.

2. The method of forming from powdered or granular material a compressed shape having one dimension materially greater than another dimension, which comprises introducing the material into an elastic container of approximately the same shape but of larger size than that of the desired article, compressing the container with the material therein by substantially uniform fluid pressure external to the container, and limiting the contraction of the container along said greater dimension so that the contraction is proportionately greater along the shorter dimension, and then releasing the pressure simultaneously from all dimensions.

3. The method of forming a compressed elongated shape from powdered or granular material, which comprises introducing the material into an elastic container of approximately the same shape but of larger size than that of the desired article, compressing the container with the material therein by substantially uniform fluid pressure external to the container, and limiting the longitudinal contraction of the container, and releasing both lateral and longitudinal pressure simultaneously.

4. The method of forming a compressed approximately cylindrical shape from powdered or granular material, which comprises introducing the material into an elastic container of approximately the same shape but of larger size than that of the desired article, compressing the container with the material therein by substantially uniform fluid pressure external to the container, and limiting the axial contraction of the container, and releasing both radial and axial pressure simultaneously.

5. The method of forming a compressed shape from powdered or granular material, which comprises introducing the material into an elastic container by greater gaseous pressure within the material adjacent the container than there is within the container and compressing the material within the container by fluid pressure applied to the exterior thereof.

6. The method of forming a compressed shape from powdered or granular material, which comprises introducing the material into an elastic container, compressing the material within the container by fluid pressure exerted on the exterior thereof and connecting the material within the container to a high vacuum to withdraw gas from the pores thereof before compression is completed.

7. The method of forming a compressed shape from powdered or granular material, which comprises dropping the material into a container, subjecting the material to a vacuum as it enters the container and thereafter reducing the size of the container and thereby compressing the material within the container.

8. The method of forming a compressed shape from powdered or granular material, which comprises introducing the material into an elastic container, connecting the material within the container to a high vacuum and thereafter compressing the material within the container by fluid pressure exerted upon the exterior of the container.

9. The method of forming a compressed shape from powdered or granular material, which comprises introducing the material into a container by greater gaseous pressure within the material adjacent the container than there is within the container, thereafter connecting the space within the container to a high vacuum and compressing the material within the container.

10. The method of forming a compressed shape from powdered or granular material, which comprises introducing the material into an elastic container by evacuating the container and connecting the filling orifice thereof with the material, thereafter connecting the interior of the container with a vacuum higher than that employed in the first said evacuation and subjecting the exterior of the container to fluid pressure.

11. The method of forming a ceramic article for firing, which comprises preparing a substantially uniform ceramic powder, introducing the powder into an elastic container of substantially the shape of the desired article, and compressing the container with the powder therein by uniform fluid pressure external to the container along every line passing through the container.

12. The method of forming a ceramic article for firing having one dimension materially greater than another, which comprises preparing a substantially uniform ceramic powder, introducing the powder into an elastic container of substantially the shape of the desired article, compressing the container with the powder therein by uniform fluid pressure external to the container along every line passing through the container, limiting the contraction of the container along said greater dimension so that the contraction is proportionately greater along the shorter dimension, and releasing pressure from all dimensions simultaneously.

13. The method of forming an approximately cylindrical ceramic article for firing, which comprises preparing a substantially uniform ceramic powder, introducing the powder into an elastic container of substantially the shape of the desired article, compressing the container with the powder therein by uniform fluid pressure external to the container along every line passing through the container, limiting the axial contraction of the container, and releasing the axial and radial pressure simultaneously.

14. The method of preparing ceramic articles for firing, which comprises producing a slip substantially uniform throughout, preparing from the slip a substantially uniform powder, introducing the powder into an elastic container substantially of the shape of the desired article and compressing the container by uniform fluid pressure external thereto.

15. The method of preparing a ceramic article for firing, which comprises forming a substantially uniform slip, drying the slip sufficiently to disintegrate, thereafter disintegrating the dried material, and introducing the disintegrated material into an elastic container of substantially the same shape as the desired article, and compressing the material within the container by substantially uniform fluid pressure applied to the exterior of the container.

16. The method of preparing a ceramic article for firing, which comprises preparing a substantially uniform slip, drying the slip in a filter press, drying the filter cake, granulating the filter cake, evenly moistening the granulated material until it contains between 3% and 14% moisture, disintegrating the granulated material to a powder, introducing the powdered material into an elastic container of substantially the same shape as the desired article and compressing the powder within the container by fluid pressure upon the exterior of the elastic container.

17. The method of forming a ceramic article for firing, which comprises introducing a substantially uniform ceramic dust into an elastic container by greater gaseous pressure within the dust adjacent the container than there is within the container, and compressing the powder within the container by fluid pressure applied to the exterior of the container.

18. The method of forming a ceramic article for firing, which comprises introducing substantially uniform powdered ceramic material into an elastic container, compressing the material within the container by fluid pressure exerted on the exterior thereof and simultaneously applying vacuum to the material within the container to withdraw gas from the pores thereof.

19. The method of forming a ceramic article for firing, which comprises introducing ceramic powder into a mold by evacuating the space within the mold and connecting the inlet orifice of the mold with a supply of powder, and compressing the powder within the mold.

20. The method of forming a ceramic article for firing, which comprises introducing ceramic powder into a mold by evacuating the space within the mold and connecting the inlet orifice of the mold with a supply of powder, compressing the powder within the mold, and subjecting the powder to a vacuum during compression to evacuate the gases from the pores of the material.

21. The method of forming a ceramic article for firing, which comprises introducing ceramic powder into an elastic container of substantially the same shape as the desired article by connecting the inlet orifice of the container with a supply of the powder and evacuating the space within the container, thereafter subjecting the exterior of the container to fluid pressure to compress the material therein, and subjecting the contents of the container to vacuum during the compression to withdraw gases from the pores of the material.

22. The method of forming a ceramic article for firing, which comprises introducing ceramic powder into an elastic container of substantially the same shape as the desired article by connecting the inlet orifice of the container with a supply of the powder and evacuating the space within the container, connecting the space within the container to a high vacuum and subjecting the exterior of the container to fluid pressure to compress the material therein, and subjecting the contents of the container to vacuum during the compression to withdraw gases from the pores of the material.

23. The method of forming a ceramic article for firing, which comprises forming a substantially uniform slip, drying the slip and forming therefrom a slightly moist uniformly disintegrated powder, introducing the powdered material into a mold, connecting the interior of the mold having the material therein with a high vacuum and thereafter compressing the material in the mold sufficiently so that it will hold its shape.

24. The method of molding powdered or granular material, which comprises partially evacuating an elastic container, subjecting the exterior of the container to a higher vacuum and thereby expanding it, filling the material into the expanded container, and thereafter subjecting the exterior of the container to fluid pressure.

25. The method of molding powdered or granular material, which comprises partially evacuating an elastic container, subjecting the exterior of the container to a higher vacuum and thereby expanding it, filling the expanded container with powder, subjecting the exterior of the filled container to fluid pressure, and stopping the compression before the container is reduced below its normal size.

26. Apparatus for molding ceramic powder, comprising a mold having a cavity with an elastic external wall and a rigid core, means to introduce powdered or granular material into said cavity between the core and elastic wall, and means to apply fluid pressure to the exterior of the elastic wall and press said wall towards said core.

27. Apparatus for forming an elongated body of compressed powdered or granular material, which comprises a mold having a cavity therein, a flexible side wall for the cavity and end walls for the cavity, one of the end walls being mounted for movement longitudinally of the cavity with means limiting the inward movement thereof, means for exerting fluid pressure on the exterior of said flexible wall, means for exerting fluid force preventing the outward movement of the movable end wall, and means for releasing simultaneously said fluid pressure and fluid force.

28. Apparatus for shaping a ceramic article for firing, comprising a casing having a cavity of substantially the shape of the desired article, an elastic container within the casing normally smaller than, but of approximately the same shape as, said cavity, and means for applying vacuum and pressure alternately to the space between the container and the casing.

29. Apparatus for shaping a ceramic article for firing, having one dimension materially greater than another, comprising a casing having a cavity of substantially the shape of the desired article, an elastic container within the casing normally smaller than, but of approximately the same shape as, said cavity, means for applying vacuum or pressure to the space between the container and the casing, and means for limiting the contraction of the container along said greater dimension whereby the contraction of the container is proportionately greater along the shorter dimension.

30. Apparatus for shaping an approximately cylindrical ceramic article for firing, comprising a casing having a cavity of substantially the shape of the desired article, an elastic container within the casing normally smaller than, but of approximately the same shape as, said cavity, means for applying vacuum or pressure to the space between the container and the casing, and means limiting the axial contraction of the container whereby the container contracts a relatively small amount axially and a relatively great amount radially.

31. Apparatus for forming ceramic material into an article to be fired, comprising a casing, an elastic container within the casing, the casing being provided with means for evacuating the space between the container and the casing, and means providing an inlet opening for material into the container, there being vacuum passages in the apparatus adapted to connect the interior of the container with a source of vacuum.

32. Apparatus for forming ceramic material into an article to be fired, comprising a casing, an elastic container within the casing, the casing being provided with means for evacuating the space between the container and the casing, a removable funnel adapted to introduce powdered material into the container and a removable plug adapted to form a stopper for the filling opening, the apparatus being provided with passages adapted to connect the interior of the container with a vacuum pipe both when the funnel is in position and when the plug is in position.

33. Apparatus for forming ceramic material into an article to be fired, comprising a casing, an elastic container within the casing, means providing a filling opening into the container, and a plug adapted to close the filling opening, there being passages in the apparatus adapted to connect the interior of the container with a vacuum pipe both while the plug is removed and while it is in place.

34. Apparatus for forming ceramic material into an article to be fired, comprising a casing, an elastic container within the casing, means providing a filling opening into the container, and a plug adapted to close the filling opening, there being passages in the apparatus adapted to connect the interior of the container with a vacuum pipe both while the plug is removed and while it is in place, the plug being provided with a porous material on its face next to the space within the container.

35. Apparatus for forming a ceramic article with a shoulder thereon comprising a casing having a cavity therein of substantially the shape of the article, an elastic container within the casing having the portion of its walls adapted to register with the shoulder cavity of the casing thinner than other portions of its walls, there being passages through the casing adapted to apply vacuum or pressure to the space between the casing and the container.

36. Apparatus for forming a ceramic article comprising a casing having a cavity therein of substantially the shape of the article, and an elastic container within the casing having a cavity therein in its unexpanded condition somewhat smaller than and the same shape as the article, there being passages through the casing adapted for application of vacuum or pressure through the space between the casing and the container.

37. Apparatus for forming a ceramic article having a screw-thread in a portion thereof, comprising an elastic container and means for expanding and compressing said container, a plunger adapted to enter said container and having its end within the container screw-threaded, said screw-threaded member being mounted for slight movement towards and from the center of the container.

BENJAMIN A. JEFFERY.